June 11, 1935. O. NIEDERER 2,004,338
EGG CANDLER AND GRADER COMBINED
Filed Aug. 11, 1933 5 Sheets-Sheet 1
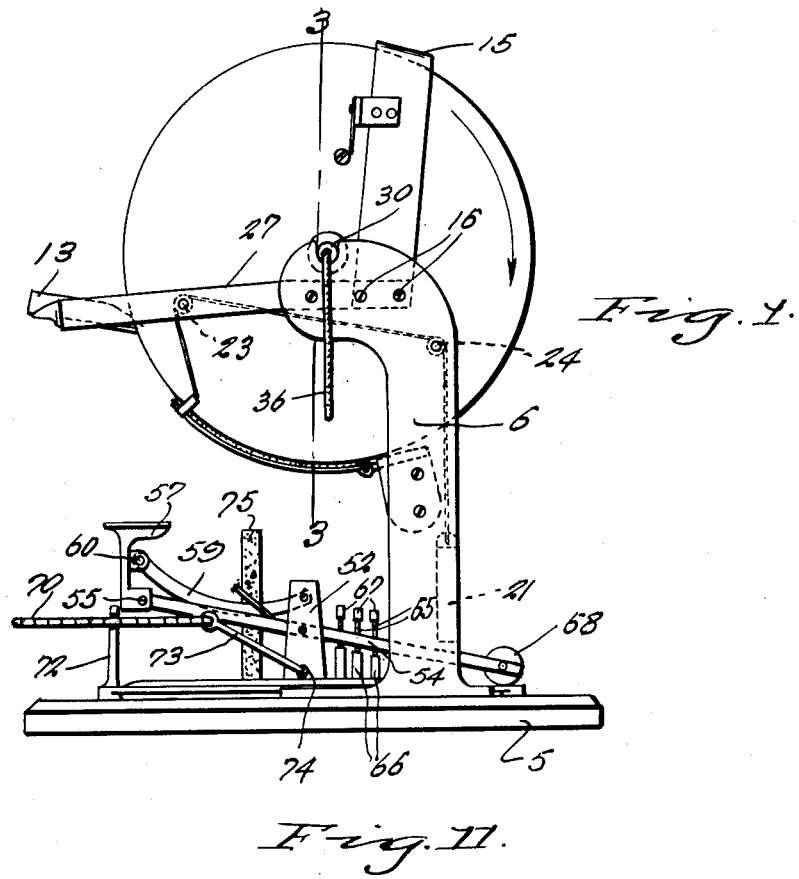
Fig. I.
Fig. II.
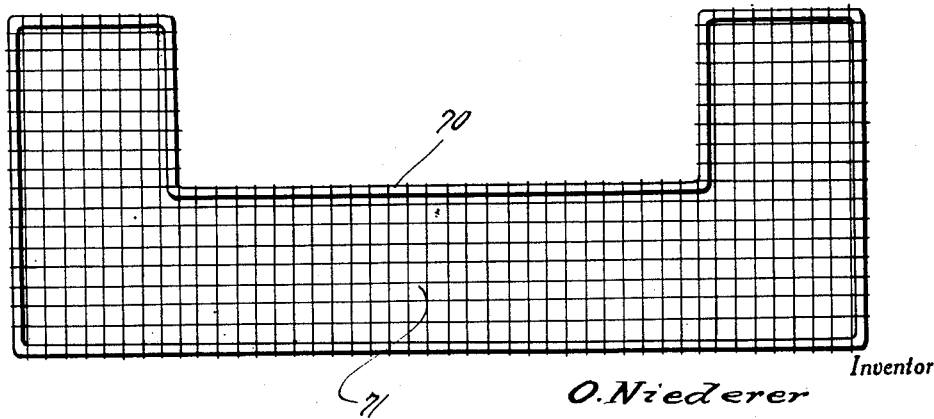
Inventor
O. Niederer
By *Clarence A. O'Brien*
Attorney June 11, 1935. O. NIEDERER 2,004,338
EGG CANDLER AND GRADER COMBINED
Filed Aug. 11, 1933 5 Sheets-Sheet 2
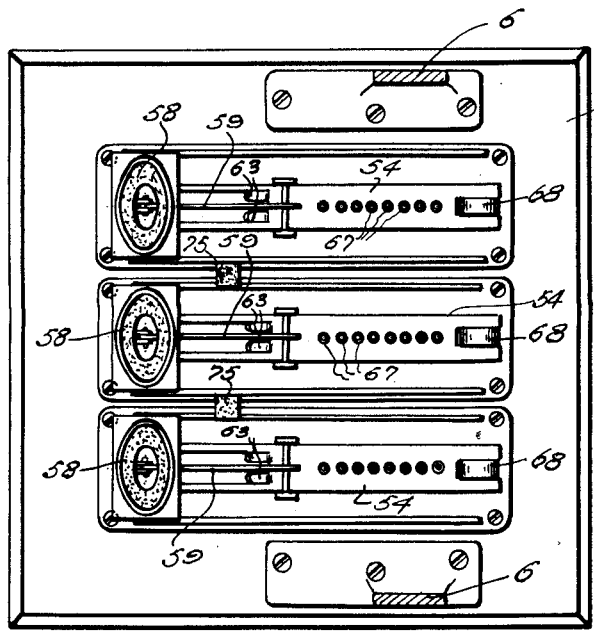
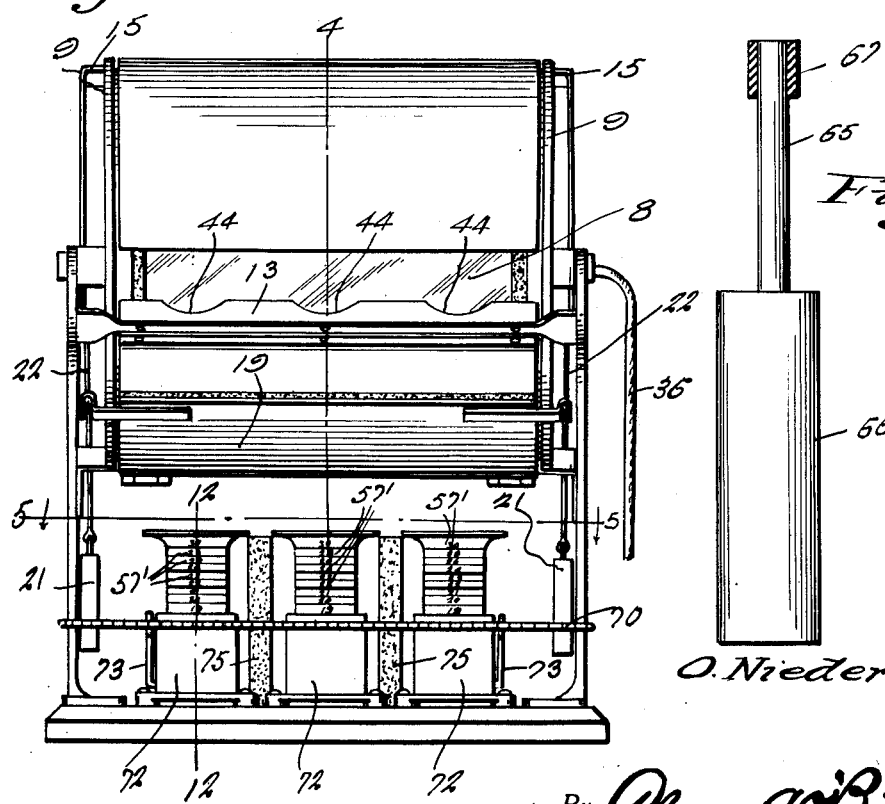
Inventor
O. Niederer
By Clarence A. O'Brien
Attorney June 11, 1935.  O. NIEDERER  2,004,338
EGG CANDLER AND GRADER COMBINED
Filed Aug. 11, 1933   5 Sheets-Sheet 3
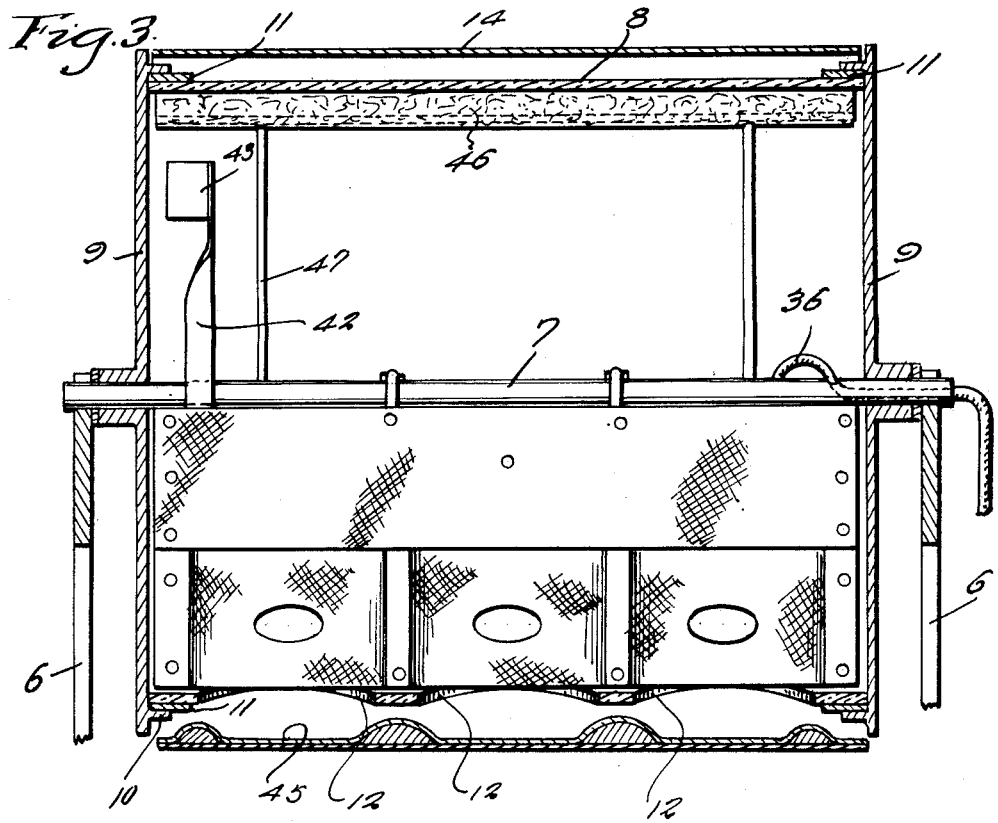
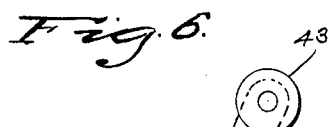
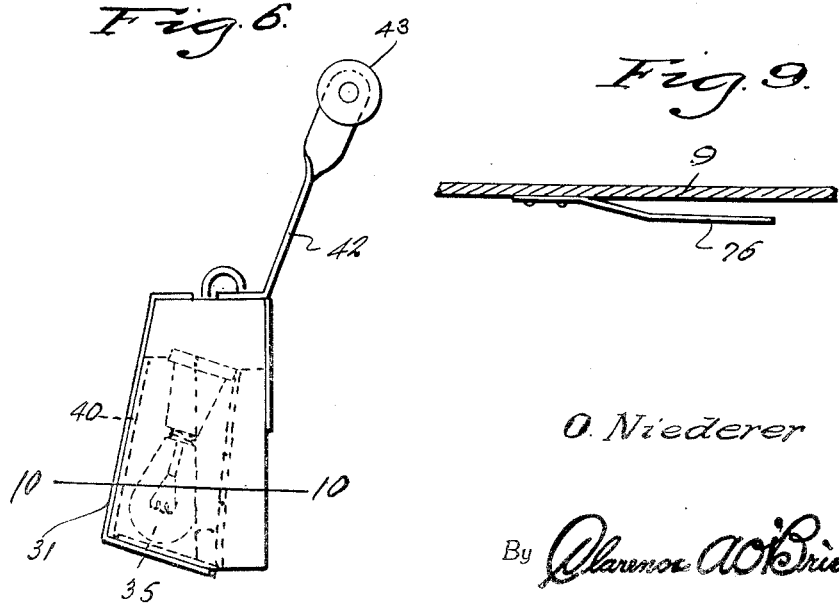
Inventor
O. Niederer
By Clarence A. O'Brien
Attorney June 11, 1935.  O. NIEDERER  2,004,338
EGG CANDLER AND GRADER COMBINED
Filed Aug. 11, 1933  5 Sheets-Sheet 4
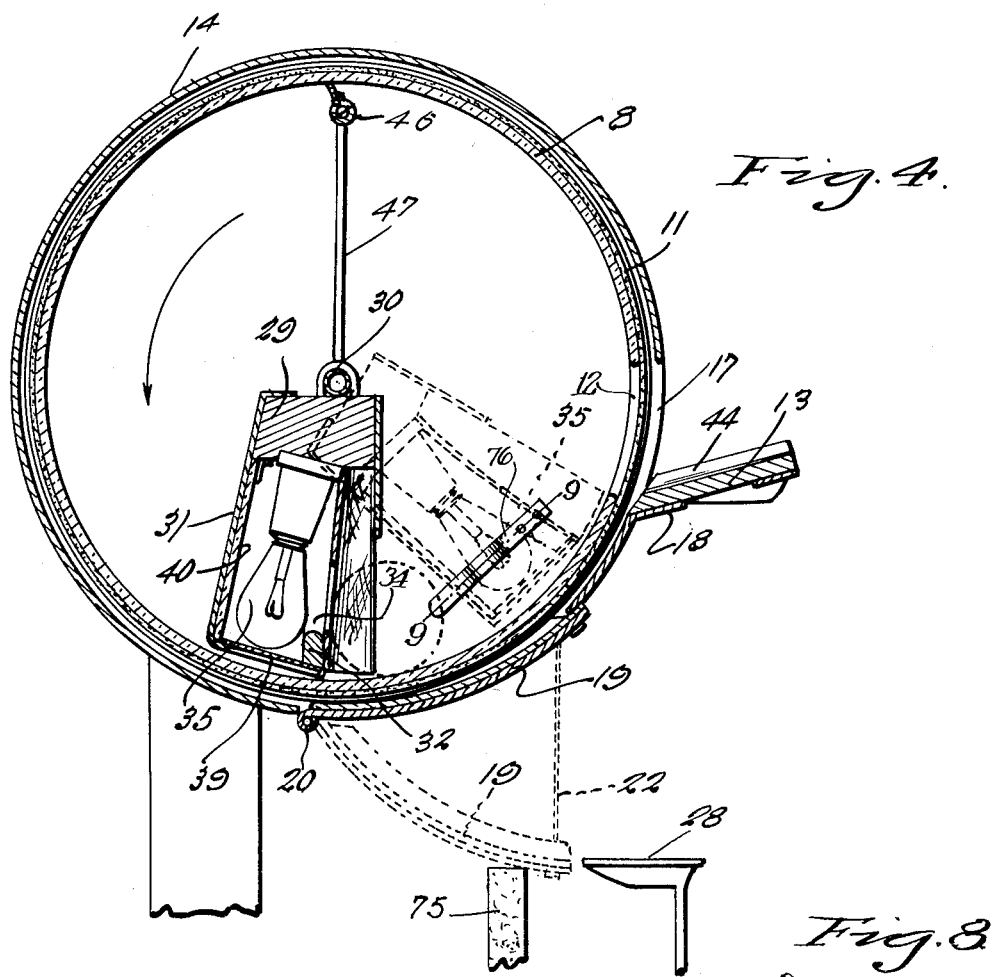
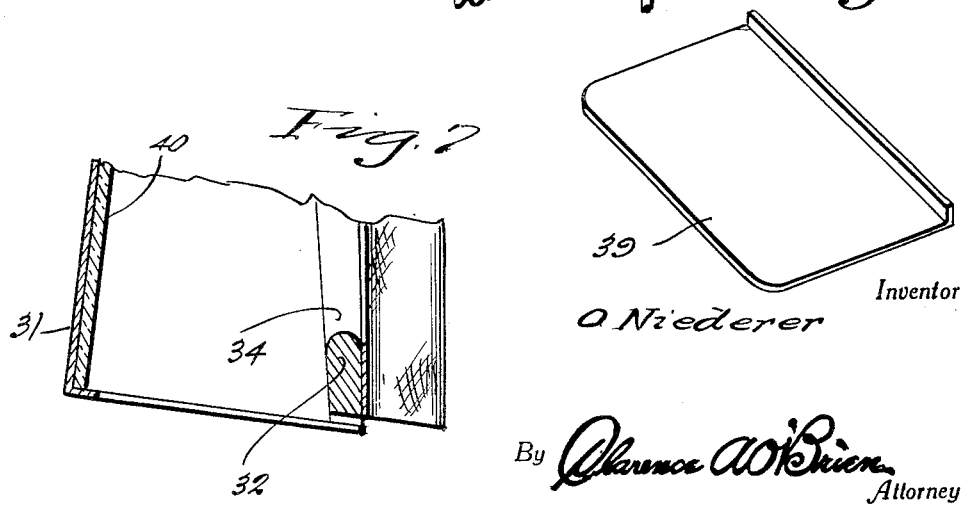
Inventor
O. Niederer
By Clarence A. O'Brien
Attorney June 11, 1935.　　　O. NIEDERER　　　2,004,338
EGG CANDLER AND GRADER COMBINED
Filed Aug. 11, 1933　　　5 Sheets-Sheet 5
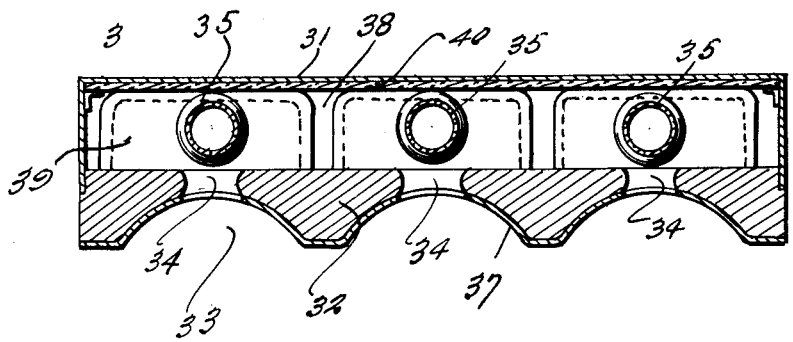
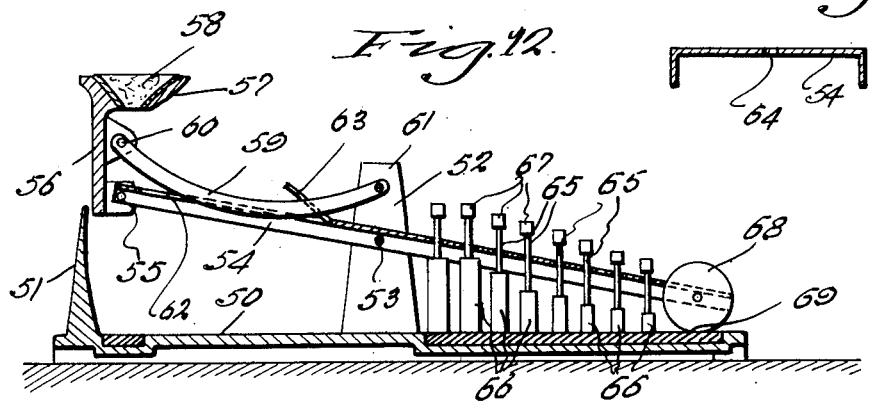
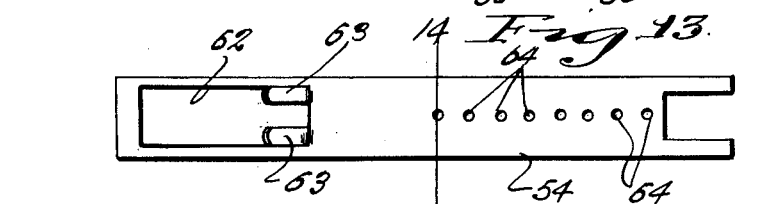
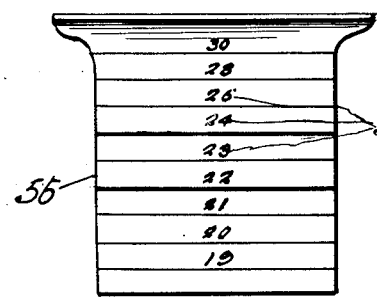
Inventor
O. Niederer
By Clarence A. O'Brien
Attorney Patented June 11, 1935

2,004,338

UNITED STATES PATENT OFFICE 2,004,338

EGG CANDLER AND GRADER COMBINED

Otto Niederer, Titusville, N. J.

Application August 11, 1933, Serial No. 684,719

2 Claims. (Cl. 99—6)

This invention relates to certain new and useful improvements in egg candling devices and has for its primary object the provision of a device of this character which is simple and economical in construction, can be easily manipulated, and provides for the handling and grading of several eggs at one and the same time.

The invention together with its numerous objects and advantages will be best understood from a study of the following description taken in connection with the accompanying drawings wherein is illustrated a preferred embodiment of the invention.

Figure 1 is a side elevational view of the device.

Figure 2 is a front elevational view thereof.

Figure 3 is a fragmentary sectional view taken substantially on the line 3—3 of Figure 1.

Figures 4, 5 and 12 are sectional views taken substantially on the lines 4—4, 5—5 and 12—12 respectively of Figure 2.

Figure 6 is an end elevational view of a combined egg stop and light holder.

Figure 7 is a fragmentary sectional view through said combined stop and light holder.

Fig. 8 is a perspective view of a slide plate forming part of the holder shown in Figure 6.

Figure 9 is a sectional view taken substantially on the line 9—9 of Figure 4.

Figure 10 is a sectional view taken substantially on the line 10—10 of Figure 6.

Figure 11 is a plan view of a net.

Figure 13 is a plan view of a rockable member forming part of a grading scale in accordance with the present invention.

Figure 14 is a sectional view taken substantially on the line 14—14 of Figure 13.

Figure 15 is a front elevational view of the scale tray and

Figure 16 is an elevational view of one of the weights.

Referring to the drawings by reference numerals it will be seen that the device comprises a base 5 to which are secured the lower ends of standards 6 having upper portions formed to accommodate a shaft 7. Rotatably mounted on the shaft 7 is a cylinder or drum 8 formed of suitable transparent material, preferably glass and provided with end plates or heads 9 having flanges 10 between which and the edge portions of the drum 8 are fitted washers 11 of felt or other suitable material.

The drum 8 is provided with a longitudinal series of inlet openings 12 through which eggs pass into the drum from a fixed inclined shelf 13 hereinafter more fully referred to.

For the drum 8 there is provided an outer metallic casing 14 suitably supported by an inverted U-shaped bracket 15 that is secured to the upper end of the standard 6 as at 16. The casing 14 is provided at the front side thereof with an opening 17, at the lower edge of which is suitably mounted as at 18 on the casing 14 the shelf 13. As is obvious eggs to be candled are placed on the shelf 13 and the drum 8 revolved so as to aline the openings 12 with the opening 17 and thereby permit the eggs to roll from the shelf 13 into the drum.

Adjacent the bottom thereof the casing 14 is provided with an outlet opening through which the eggs pass from the drum after the candling operation. For this opening there is provided a combined closure and chute 19 that is hinged to the casing as at 20. The chute or closure 19 is normally held in a closed position through the medium of weights 21 connected by flexible cables 22 to the chute 19 as shown in Figure 4. The cables 22 are trained over pulleys 23, 24, the pulleys 24 being suitably mounted on the standard 6 while the pulleys 23 are mounted on bracket arms 27 that extend forwardly from the standards 6 and serve as a brace for the shelf 13. The weight of the eggs discharging from the drum 8 will be sufficient to overcome the weights 21 so that the chute 19 will swing to a dotted line position shown in Figure 4 for discharging the candled eggs onto the trays 57 of grading scales provided therefor. The scales will be hereinafter referred to with more particularity.

Mounted within the drum 8 on the shaft 7 for swinging movement relative thereto is a combined stop and light holder, the same comprising a top block 29 of wood or other suitable material and provided with substantially inverted U-shaped hangers 30 which engage the shaft 7 in the manner clearly shown in the drawings for suspending the stop and light holder from the shaft. Secured to one side edge of the block 29 is a substantially U-shaped metallic plate 21 that provides the back and end walls for the stop and light holder. The front of said stop and light holder comprises a block 32 of wood or other suitable material, and the same on its front face is dished out at intervals to provide egg receiving recesses 33 and apertures 34 through which the light from electric bulbs 35 is emitted to shine through the egg engaging in the recess 33 as shown in Figure 4. The block 29 is provided with sockets for the bulbs 35 and a light cord for the bulbs is indicated by the reference numeral 36.

The outer face of the block 32 is covered with felt or other suitable material 37 so as to provide a cushioning surface 48.

Access to the bulbs 35 may be had through the bottom of the combined stop and light holder, the bottom of said stop and light holder being opened and provided at intervals with guides 38 with which are engageable slides 39 for normally closing the bottom of said combined stop and light holder. Reflecting mirrors 40 for the bulbs 35 are provided on the inner face of the back wall of the device as shown in Figure 4.

For normally maintaining said combined stop and light holder in a perpendicular position there is provided on one end thereof, at the top of said holder an arm 42 provided with a weight 43.

The shelf 13 may be formed from wood or other suitable material provided on its top side with depressions 44 to accommodate the eggs and the top face of the shelf is covered by felt or other suitable cushioning material.

The combined closure and chute 19 is also provided on its top side with a series of egg receiving depressions 45 and is covered with felt or other suitable cushioning material.

For wiping the inside of the drum 8 of moisture as might gather thereon as the result of the heat from the lamps 35 there is provided a suitable wiper element 46 mounted on arms 47 that extend vertically upwardly from the shaft 7, the wiper 46 comprising a suitable support about which is wrapped felt or other suitable material to provide a tongue in wiping engagement with the wall of the drum 8 as shown in Figure 4.

Each of the grading scales, which in number will depend upon the capacity of the device comprises an elongated base plate 50 having at its forward end an upstanding part 51. Between its ends there rises vertically from the base plate 50, standards 52 between which is pivoted as at 53 an elongated bar 54. Pivotally mounted on the forward end of the bar 54 as at 55 is a scale plate 56 provided thereon with graduations 57'. The graduations 57' are for indicating ounces and the upper edge of the upstanding member 51 serves as an index to be read against the graduations 57' to indicate the weight, in ounces of an egg discharged from the chute 19 onto the scale tray 57 that is suitably provided on the upper end of the plate 56. The tray 57 is of suitable shape and is provided with a suitable padding 58. For maintaining the plate 56 vertical and the tray 57 in a horizontal position there is provided an arcuate link 59 which is pivoted at one end as at 60 to the plate 50, and at a relatively opposite end as at 61 between the standards 62. The intermediate portion of the link is accommodated in a slot 62 provided in the forward end of the plate 54 and at one end of the slot there rises inclined fingers 63 disposed at opposite sides of the link 59 and which serves to prevent undue lateral movement of the link 59.

At its rear end the plate 54 is provided with a series of apertures 64 to accommodate the shanks 65 of weights 66 which weights 66 progress in size as shown in Figure 12. The upper ends of the shanks 65 for the weights are provided with heads 67 of rubber or other suitable material. On the rearmost end thereof the plate 64 is provided with a suitable roller 68. At the rear end thereof the plate 50 is provided with a suitable depression in which is fitted a cushion of rubber or the like 69.

To catch such eggs as might fall from the scale trays 57 there is provided a removable net which is substantially U-shaped and comprises a frame 70 to which is secured a netting 71. Said net is applied to the device in a manner clear from Figures 1 and 2, post 72 being provided and having at their upper ends notches to accommodate the inner portions of the frame 70 at the sides thereof. Links 73 are engaged at one end with the free ends of the sides of the frame 70 and are engaged in any suitable manner as indicated at 74 to the outside standards 52 of the endmost scales.

For the swingable chute 19 I have provided vertical bumpers 75 of rubber or other suitable material, the same being suitably anchored at their lower ends to the base 5.

The operation and utility of the device will be apparent from the following:

The eggs to be candled, in the present instance to the number of three are placed on the shelf 13 one in each depression 14. The drum 8 is revolved in an anti-clockwise direction so that the spring 76 that is anchored on the inside of one of the end plates 9 will engage with the combined stop and light holder to swing the same to the dotted line position shown in Figure 4, and to place the openings 12 in registry with the opening 17 so that the eggs on the shelf 13 will pass therethrough into the drum 8 and engage the recesses 33. The weight of the eggs will overcome the action of the spring 76 thus returning the combined stop and light holder to the position shown in Figure 4. The drum 8 is continuously revolved in the direction indicated by the arrow shown in Figure 4 and as the drum revolves the eggs are also caused to revolve, and the light shining through the eggs from the lamps 35 will clearly show any deficiency in the eggs.

As the drum 8 continues to revolve the opening in the bottom thereof will be moved opposite to the tray 17 so that the eggs will then be supported by the tray, and the same under the weight of the eggs will swing to the dotted line position shown in Figure 4 to thus discharge the eggs on to the trays 57 of the scales.

Under weight of the eggs on the trays 57 the bars 54 of the scales will swing downwardly and by reading the graduations 57 relative to the upper edges of the vertical indexes 51 the weight of each egg may be readily determined and thus a grading of the eggs can be easily accomplished by the operator.

Adverting to the spring 76 it will be apparent that when the device is operated as above suggested the drum will rotate relative to the combined stop and light holder for a fraction of a revolution of the drum, when the spring 76 will then move into position between the wall of the drum with which it is associated and one end of the combined stop and light holder so that the free end of the spring will frictionally bear against the adjacent end of said combined stop and light holder. As a result the holder will be caused to swing with the drum from the full line position shown in Figure 4 to the dotted line position in said figure. When in this position the weight of the eggs assisted by the weight 42, and the continuous rotation of the drum will all serve to urge the member 31 in a direction reverse to the direction of rotation of the drum, causing the member 31 to swing from the dotted line position back to the full line position of Figure 4 as the drum continues to rotate.

Having thus described my invention, what I claim as new is:—

1. In an egg candler, a fixed casing provided with egg inlet and discharge openings, a drum revolubly mounted in said casing and having a peripheral wall provided with egg intake and discharge openings, a combined egg stop and light support extending longitudinally of the drum and mounted to swing relative to the drum on an axis common to the drum, said combined stop and light support including a substantially hollow member provided on one side thereof with light emitting openings, and illuminating elements mounted within said combined stop and light support; and a resilient spring member mounted on one end wall of the drum and movable therewith into frictional engagement with an adjacent end of the combined stop and light support for rotating the support with the drum for a fraction of a revolution of the drum, as and for the purpose specified.

2. In an egg candling device a casing provided with inlet openings and a discharge opening, a combination hinged closure and chute for the discharge opening of the casing, a transparent drum rotatably mounted within the casing and provided in its periphery with openings for registry with the intake openings in the casing for the passage of eggs into the drum, and for registry with the discharge opening of the casing for the discharge of the eggs, a combined egg stop and light support mounted in the drum for rotation about an axis common to the drum, said combined stop and light support including a hollow body having a face thereof provided with a series of egg accommodating recesses and an aperture for each recess, and lamps arranged within said body and arranged in operative position to said recesses.

OTTO NIEDERER.